(12) United States Patent
Krishnan et al.

(10) Patent No.: US 11,680,830 B2
(45) Date of Patent: Jun. 20, 2023

(54) ROTATING SENSOR ASSEMBLY

(71) Applicant: Ford Global Technologies, LLC, Dearborn, MI (US)

(72) Inventors: Venkatesh Krishnan, Canton, MI (US); Michael Robertson, Jr., Garden City, MI (US); Rashaun Phinisee, Ypsilanti, MI (US); Raghuraman Surineedi, Dearborn, MI (US); Segundo Baldovino, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 17/156,732

(22) Filed: Jan. 25, 2021

(65) Prior Publication Data
US 2022/0236084 A1    Jul. 28, 2022

(51) Int. Cl.
| G01D 11/24 | (2006.01) |
| B60H 1/00 | (2006.01) |
| B60R 11/00 | (2006.01) |
| G01S 17/86 | (2020.01) |

(52) U.S. Cl.
CPC ....... *G01D 11/245* (2013.01); *B60H 1/00271* (2013.01); *B60R 11/00* (2013.01); *G01S 17/86* (2020.01); *B60H 2001/003* (2013.01); *B60R 2011/004* (2013.01); *B60R 2011/0085* (2013.01)

(58) Field of Classification Search
CPC ............. G01D 11/245; B60H 1/00271; B60H 2001/003; B60R 11/00; B60R 2011/004; B60R 2011/0085; B60R 11/04; G01S 17/86
See application file for complete search history.

(56) References Cited

U.S. PATENT DOCUMENTS

| 10,307,800 | B1* | 6/2019 | Lombrozo | G02B 27/0006 |
| 2017/0305360 | A1* | 10/2017 | Zajac | B60R 11/04 |
| 2019/0250017 | A1* | 8/2019 | Greiner | G01D 11/245 |
| 2019/0384313 | A1* | 12/2019 | Toth | G01S 7/4813 |

FOREIGN PATENT DOCUMENTS

| DE | 102018215131 A1 | 3/2020 |
| DE | 102018221880 A1 | 6/2020 |

* cited by examiner

*Primary Examiner* — Yoshihisa Ishizuka
*Assistant Examiner* — Christopher J Gassen
(74) *Attorney, Agent, or Firm* — Frank A. MacKenzie; Bejin Bieneman PLC

(57) ABSTRACT

A sensor assembly includes a base, a sensor body mounted to the base and rotatable around an axis relative to the base, a sensor window fixed relative to the sensor body, a sensing apparatus inside the sensor body and having a field of view through the sensor window, a vapor chamber fixed relative to the sensor body, and a heat pipe extending from the sensor body to the vapor chamber. The vapor chamber is spaced radially outward from the sensor body relative to the axis and has a curved shape extending circumferentially around the axis.

20 Claims, 6 Drawing Sheets

ROTATING SENSOR ASSEMBLY

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
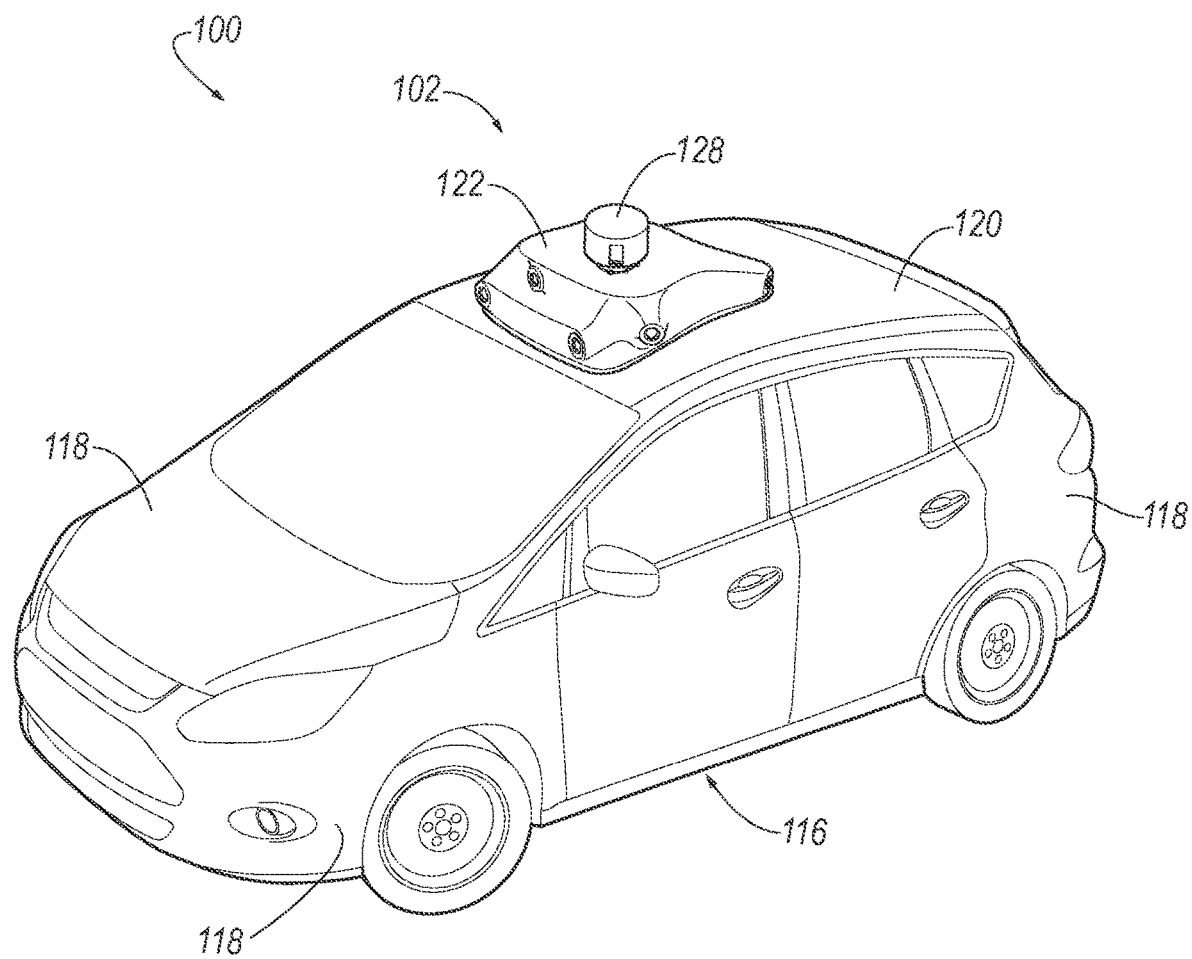
FIG. 1 is a perspective view of an example vehicle including an example sensor assembly.

A sensor assembly includes a base, a sensor body mounted to the base and rotatable around an axis relative to the base, a sensor window fixed relative to the sensor body, a sensing apparatus inside the sensor body and having a field of view through the sensor window, a vapor chamber fixed relative to the sensor body, and a heat pipe extending from the sensor body to the vapor chamber. The vapor chamber is spaced radially outward from the sensor body relative to the axis. The vapor chamber has a curved shape extending circumferentially around the axis.

The vapor chamber may be spaced circumferentially from the sensor window relative to the axis.

The vapor chamber may have a partial cylindrical shape.

The sensor assembly may further include a housing including the vapor chamber, and the vapor chamber may form part of an exterior of the housing. The housing may have a cylindrical shape. The sensor window may be recessed relative to the housing.

The sensor assembly may further include a plurality of heat pipes including the heat pipe, and each of the plurality of heat pipes may extend from the sensor body to the vapor chamber.

The sensor assembly may further include thermal adhesive attaching the heat pipe to the vapor chamber. The heat pipe may include a first segment elongated radially from the sensor body to the vapor chamber and a second segment elongated along the vapor chamber. The second segment may be elongated parallel to the axis.

The vapor chamber may have a constant cross-section extending parallel to the axis. The vapor chamber may extend parallel to the axis from below the sensor window to above the sensor window.

The vapor chamber may extend circumferentially around the axis for at least 90°.

The sensor window may be flat.

The sensor window may extend circumferentially around the axis for at most 45°.

The vapor chamber may be one of at least one vapor chamber, the sensor window may be one of at least one sensor window, the at least one sensor window may collectively extend circumferentially around the axis for at most 90°, and the at least one vapor chamber may collectively extend circumferentially around the axis for at least 270°. The at least one sensor window may include two sensor windows, and each of the sensor window may extend for at most 45°.

The at least one vapor chamber may include two vapor chambers, and each of the vapor chambers extends for at least 135°.

With reference to the Figures, a sensor assembly 102 of a vehicle 100 includes a base 104, a sensor body 106 mounted to the base 104 and rotatable around an axis A relative to the base 104, a sensor window 108 fixed relative to the sensor body 106, a sensing apparatus 110 inside the sensor body 106 and having a field of view through the sensor window 108, a vapor chamber 112 fixed relative to the sensor body 106, and a heat pipe 114 extending from the sensor body 106 to the vapor chamber 112. The vapor chamber 112 is spaced radially outward from the sensor body 106 relative to the axis A and has a curved shape extending circumferentially around the axis A.

The sensor assembly 102 dissipates heat in an efficient manner. The sensing apparatus 110 in the sensor body 106 can generate heat during operation. The heat pipe 114 can transmit heat from the sensor body 106 to the vapor chamber 112, and the vapor chamber 112 can transmit heat to the external environment away from the sensor assembly 102. The rotation of the vapor chamber 112 with the sensor body 106 creates airflow across the vapor chamber 112, which facilitates a high rate of heat transfer to the environment. The sensor body 106 rotates to provide the sensing apparatus 110 with a 360° view of the surrounding environment, so the rotation of the vapor chamber 112 is a byproduct not requiring any additional components for the increased heat transfer. The curved shape of the vapor chamber 112 permits smooth airflow across the vapor chamber 112, which provides for low drag and high heat transfer.

With reference to FIG. 1, the vehicle 100 may be any suitable type of automobile, e.g., a passenger or commercial automobile such as a sedan, a coupe, a truck, a sport utility vehicle, a crossover vehicle, a van, a minivan, a taxi, a bus, etc. The vehicle 100, for example, may be an autonomous vehicle. In other words, the vehicle 100 may be autonomously operated such that the vehicle 100 may be driven without constant attention from a driver, i.e., the vehicle 100 may be self-driving without human input. Autonomous operation can be based in part on data received from the sensor assembly 102.

The vehicle 100 includes a vehicle body 116. The vehicle body 116 includes body panels 118 partially defining an exterior of the vehicle 100. The body panels 118 may present a class-A surface, e.g., a finished surface exposed to view by a customer and free of unaesthetic blemishes and defects. The body panels 118 include, e.g., a roof 120, etc.

A casing 122 for the sensor assembly 102 and other sensors is attachable to the vehicle 100, e.g., to one of the body panels 118 of the vehicle 100, e.g., the roof 120. For example, the casing 122 may be shaped to be attachable to the roof 120, e.g., may have a shape matching a contour of the roof 120. The casing 122 may be attached to the roof 120, which can provide the sensing apparatuses 110 of the sensor assembly 102 with an unobstructed field of view of an area around the vehicle 100. The casing 122 may be formed of, e.g., plastic or metal. The sensor assembly 102 is supported by the casing 122. The sensor assembly 102 can be disposed on top of the casing 122 at a highest point of the casing 122.

Figure 2:
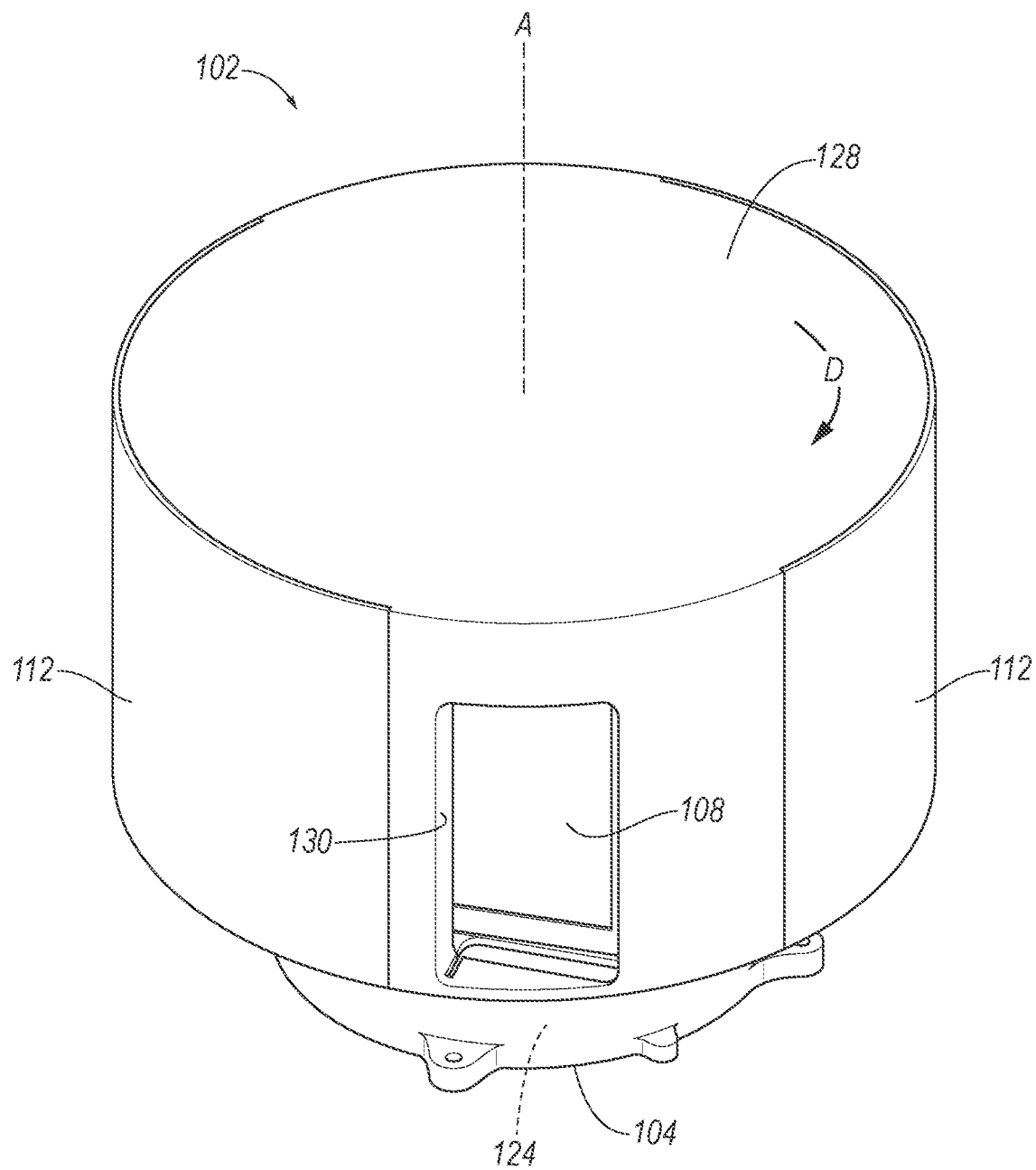
FIG. 2 is a perspective view of the sensor assembly.
Figure 3:
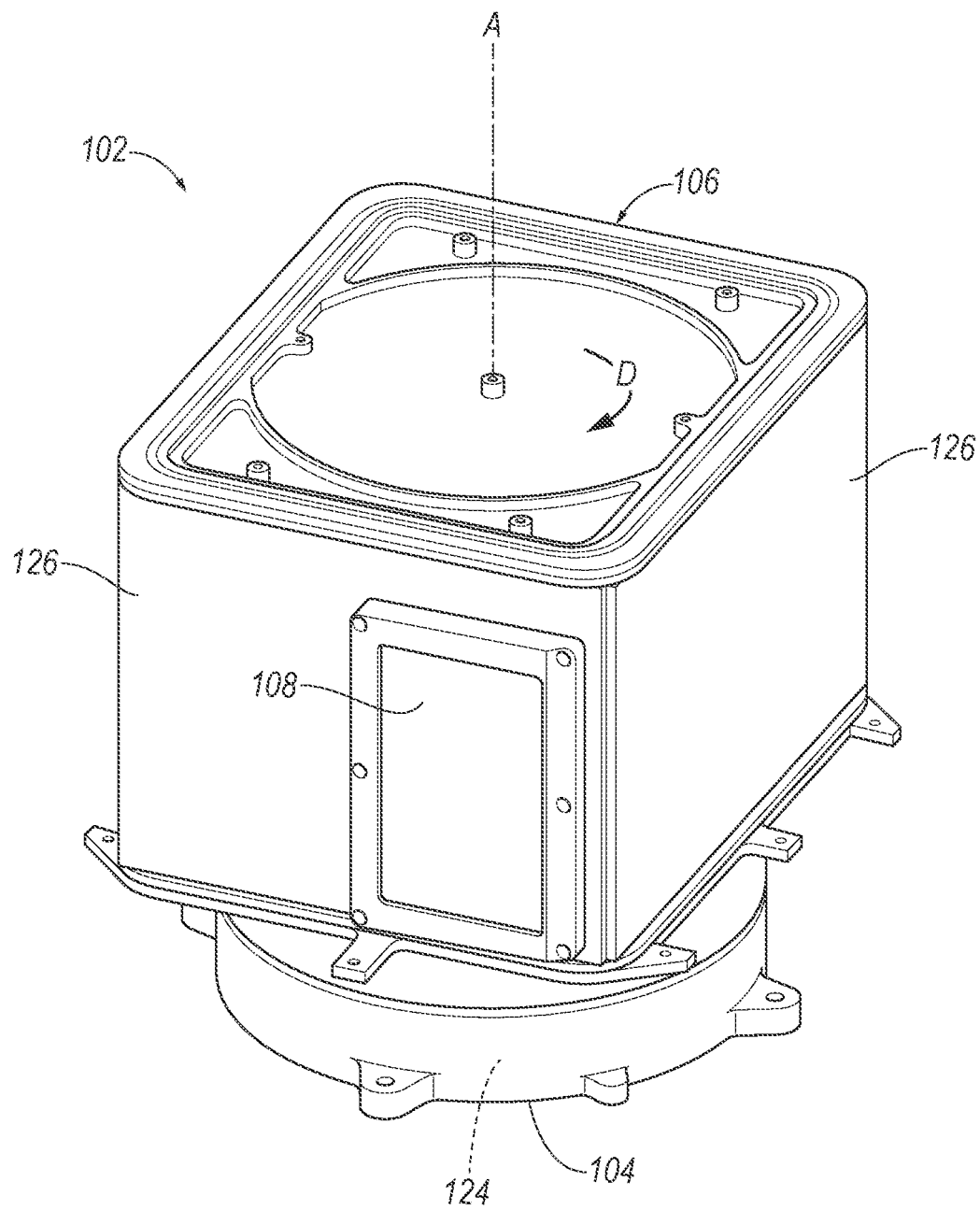
FIG. 3 is a perspective view of the sensor assembly with a housing and heat pipes removed for illustration.

With reference to FIGS. 2 and 3, the sensor assembly 102 includes the base 104. The base 104 is attached to the casing 122 on top of the casing 122. The base 104 can be bolted to the casing 122, e.g., through bolt holes in the base 104. The base 104 is mounted to the vehicle 100, e.g., via the casing 122, and the vehicle 100 defines a forward direction, i.e., a direction of forward travel for the vehicle 100.

The sensor assembly 102 includes a motor 124. The motor 124 is arranged to drivably rotate the sensor body 106 in a direction of rotation D around the axis A. The motor 124 can be positioned, e.g., inside the base 104. The motor 124 can be, e.g., an electric motor.

With reference to FIG. 3, the sensor assembly 102 includes the sensor body 106. The sensor body 106 includes walls 126, e.g., four vertical walls 126 as shown in the Figures. The walls 126 can have the same horizontal length, i.e., the walls 126 can form a square horizontal cross-section. The sensing apparatuses 110 are contained inside the sensor body 106. The sensor body 106 is mounted to the base 104 and is rotatable around the axis A relative to the base 104, e.g., by being drivable by the motor 124.

The sensor assembly 102 includes at least one sensing apparatus 110, e.g., two sensing apparatuses 110. The sensing apparatuses 110 may be designed to detect features of the outside world; for example, the sensing apparatuses 110 may be radar sensors, scanning laser range finders, light detection and ranging (LIDAR) devices, or image processing sensors such as cameras. In particular, the sensing apparatuses 110 may be LIDAR devices, e.g., scanning LIDAR devices. A LIDAR device detects distances to objects by emitting laser pulses at a particular wavelength and measuring the time of flight for the pulse to travel to the object and back. The sensing apparatuses 110 are disposed inside the sensor body 106 and are fixed relative to the sensor body 106. The sensing apparatuses 110 have fields of view through the respective sensor windows 108 encompassing respective regions from which the sensing apparatuses 110 receive input. As the sensor body 106 rotates, the fields of view encompass a horizontal 360° around the vehicle 100.

The sensor assembly 102 can include at least one sensor window 108, specifically one sensor window 108 for each sensing apparatus 110, e.g., two sensor windows 108. The sensor windows 108 are fixed relative to the sensor body 106 and rotatable with the sensor body 106. For example, the sensor windows 108 are each positioned on and attached to one of the walls 126. Each sensor window 108 can be off-center on the respective wall 126. For example, the sensor window 108 can be positioned closer to a trailing edge of the respective wall 126 than a leading edge of the wall 126 with respect to the direction of rotation D. For example, each sensor window 108 can be positioned in a trailing half of the respective wall 126 with respect to the direction of rotation D. The sensor windows 108 can be flat. For example, the sensor windows 108 can have a rectangular shape. The sensor windows 108 are transparent with respect to whatever medium the sensing apparatuses 110 are capable of detecting. For example, if the sensing apparatuses 110 are LIDAR devices, then the sensor windows 108 are transparent with respect to visible light at the wavelength generated and detectable by the sensing apparatuses 110.

Figure 4:
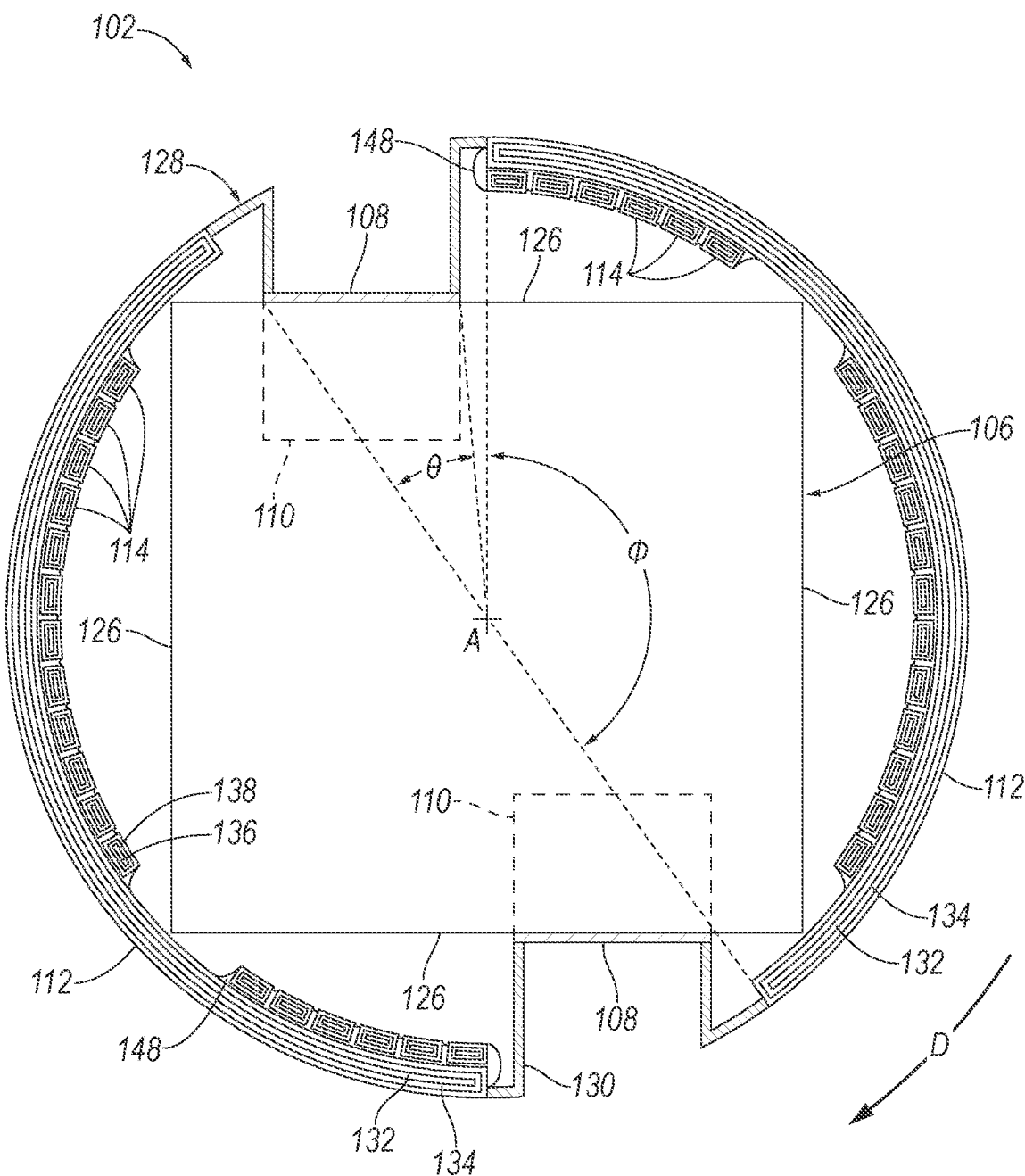
FIG. 4 is a top cross-sectional view of the sensor assembly.

With reference to FIG. 4, the sensor windows 108 have a collective circumferential extent around the axis A, that is, a collective angular sweep covered by the sensor windows 108. The circumferential extent around the axis A of each sensor window 108 is an angle θ formed at the axis A between a clockwisemost point and a counterclockwisemost point of that sensor window 108, i.e., an angular sweep around the axis A from one circumferential end of that sensor window 108 to the other circumferential end of that sensor window 108. For example, the sensor windows 108 can collectively extend circumferentially around the axis A for at most 90°. The first sensor window 108 and the second sensor window 108 can each extend circumferentially around the axis A for at most 45°. The comparatively small angular sweep of the sensor windows 108 with respect to a housing 128 of the sensor assembly 102 provides a small area to keep clean and is accommodated by the fact that the housing 128 and the sensor windows 108 rotate.

Returning to FIGS. 2 and 3, the housing 128 is mounted to the sensor body 106 and is rotatable with the sensor body 106 relative to the base 104 around the axis A in the direction of rotation D. For example, the housing 128 can be mounted, e.g., fastened, to the sensor body 106. The housing 128 can cover a top and sides of the sensor body 106. The housing 128 has a cylindrical shape centered on the axis A and defining the axis A. The housing 128 can have a constant cross-section from a bottom of the sensor windows 108 to a top of the sensor windows 108. Except for openings 130 for the sensor windows 108, the housing 128 can have a constant cross-section from a distance below the sensor windows 108 to a distance above the sensor windows 108. The constant cross-section can reduce forces tending to roll or pitch the housing 128 as the housing 128 rotates.

The sensor windows 108 are recessed relative to the housing 128, i.e., are set inward from outer cylindrical wall of the housing 128. The sensor windows 108 are positioned in the openings 130. The openings 130 can have a shape corresponding to a shape of the respective sensor windows 108 projected perpendicular from the respective wall 126 onto the housing 128.

With reference to FIG. 4, the housing 128 includes at least one vapor chamber 112, e.g., two vapor chambers 112. A vapor chamber is a plate-shaped heat-transfer device in which a working fluid evaporates inside the vapor chamber at a "hot" region of the plate shape and condenses inside the vapor chamber at a "cool" region. For example, the hot region can be a center, and the cool region can be an outer edge; the hot region can be a left end, and the cool region can be a right end; etc. The vapor chamber 112 is plate-shaped in that the vapor chamber 112 has a thickness that is significantly less than a length and significantly less than a width of the vapor chamber 112. A vapor cavity 132 and a wick 134 extend parallel to each other along the length and the width of the vapor chamber 112. Evaporated working fluid can move from the hot region to the cool region via the vapor cavity 132, and condensed working fluid can move back from the cool region to the hot region via the wick 134, e.g., by capillary action. The working fluid can be water, ammonia, etc., according to the temperature range from the hot region to the cool region.

Figure 5:
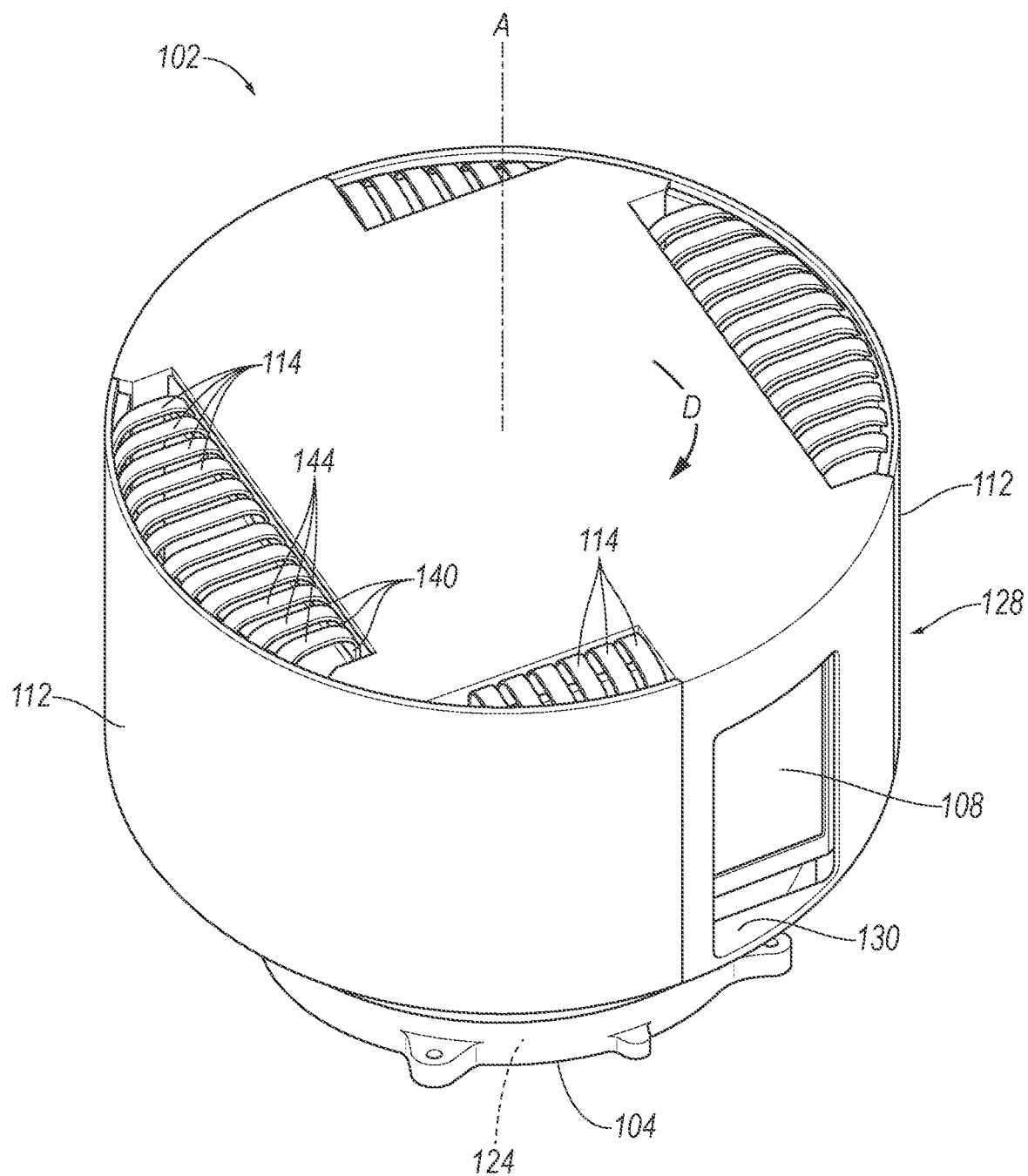
FIG. 5 is a perspective view of the sensor assembly with portions of the heat pipes exposed for illustration.
Figure 6:
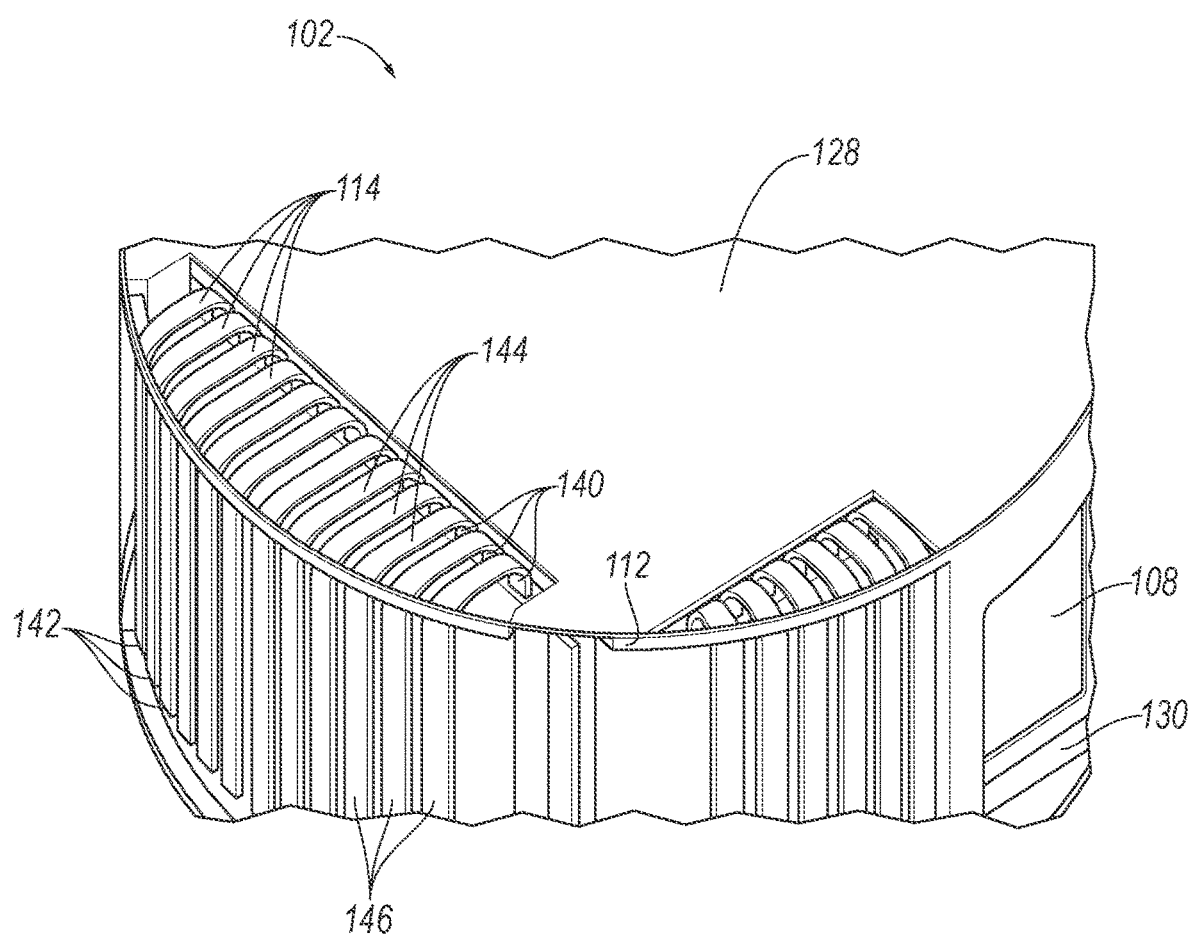
FIG. 6 is a perspective view of a portion of the sensor assembly with portions of the heat pipes exposed for illustration.

With reference to FIGS. 4-6, the vapor chambers 112 are fixed relative to the sensor body 106 along with the rest of the housing 128. The vapor chambers 112 are spaced radially outward from the sensor body 106 relative to the axis A. The vapor chambers 112 form part of an exterior of the housing 128.

Each vapor chamber 112 has a curved shape extending circumferentially around the axis A, e.g., a partial cylindrical shape extending circumferentially around the axis A at a constant outer radius from the axis A. Each vapor chamber 112 extends circumferentially at the constant outer radius between the sensor windows 108. Because of the constant outer radius, the rotational motion of the vapor chambers 112 does not displace air for the circumferential extent of the vapor chambers 112, providing smooth airflow across the vapor chambers 112. Transitions between the vapor chambers 112 and other portions of the housing 128 are smooth; e.g., the constant outer radius of the vapor chambers 112 is the same as the outer radius of the rest of the housing 128.

Each vapor chamber 112 extends circumferentially, i.e., has an angular sweep φ, for at least 90°. For example, the vapor chambers 112 can collectively extend circumferentially around the axis A for at least 270°. Each vapor chamber 112 can each extend circumferentially around the axis A for at least 135°. The vapor chambers 112 are spaced circumferentially from the sensor windows 108 relative to the axis A.

The vapor chambers 112 have constant cross-sections, i.e., of the vapor cavity 132 and wick 134, extending circumferentially at constant respective radii from the axis A, e.g., for at least 90° each. Each vapor chamber 112 extends vertically, i.e., parallel to the axis A, from below the sensor windows 108 to above the sensor windows 108. Each vapor chamber 112 has a constant cross-section extending parallel to the axis A, e.g., from below the sensor windows 108 to above the sensor windows 108.

With reference to FIG. 4, the sensor assembly 102 includes at least one heat pipe 114, e.g., a plurality of heat pipes 114. A heat pipe is a heat-transfer device in which a working fluid evaporates inside the heat pipe at a "hot" end and condenses inside the heat pipe at a "cool" end. Evaporation absorbs heat, and condensation releases heat. A vapor cavity 136 and a wick 138 extend from the hot end to the cool end. Evaporated working fluid can move from the hot end to the cool end via the vapor cavity 136, and condensed working fluid can move back from the cool end to the hot end via the wick 138, e.g., by capillary action. The working fluid can be water, ammonia, etc., according to the temperature range from the hot end to the cold end.

With reference to FIGS. 5 and 6, each of the heat pipes 114 extends from the sensor body 106 to one of the vapor chambers 112. Specifically, each heat pipe 114 extends from one of the walls 126 to the vapor chamber 112 that is radially outward from that wall 126. Each heat pipe 114 is elongated from a first end 140 contacting the sensor body 106 to a second end 142 contacting one of the vapor chambers 112. The first end 140 is the hot end, and the second end 142 is the cold end.

With reference to FIG. 6, each heat pipe 114 includes a first segment 144 elongated radially from the sensor body 106 to one of the vapor chambers 112 and a second segment 146 elongated along that vapor chamber 112. The first segment 144 is elongated horizontally. The first segment 144 can include the first end 140, or the heat pipe 114 can also include a third segment (not shown) elongated along the sensor body 106 and including the first end 140. The second segment 146 includes the second end 142. The second segment 146 is elongated parallel to the axis A from the first segment 144 to the second end 142. The second segment 146 provides a large area over which to transfer heat from the heat pipe 114 to the vapor chamber 112.

The heat pipes 114 are attached to the respective vapor chambers 112, e.g., with thermal adhesive 148. Thermal adhesive is adhesive with a high thermal conductivity, e.g., a thermal conductivity equal to at least 15 watts per meter-Kelvin (W/(m K)), e.g., greater than 100 W/(m K), at 25° C. The thermal adhesive 148 can be any type with a sufficiently high bonding strength and thermal conductivity, e.g., synthetic resin with metallic fillers such as silver or graphite, synthetic resin with inorganic fillers such as ceramic or mineral-based fillers, etc.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor assembly comprising:
    a base;
    a sensor body mounted to the base and rotatable around an axis relative to the base;
    a sensor window fixed relative to the sensor body;
    a sensing apparatus inside the sensor body and having a field of view through the sensor window;
    a vapor chamber fixed relative to the sensor body, spaced radially outward from the sensor body relative to the axis, and having a curved shape extending circumferentially around the axis, wherein the vapor chamber is a chamber enclosing a working fluid and is configured to transfer heat via evaporation and condensation of the working fluid within the vapor chamber; and
    a heat pipe extending from the sensor body to the vapor chamber.

2. The sensor assembly of claim 1, wherein the vapor chamber is spaced circumferentially from the sensor window relative to the axis.

3. The sensor assembly of claim 1, wherein the vapor chamber has a partial cylindrical shape.

4. The sensor assembly of claim 1, further comprising a housing including the vapor chamber, wherein the vapor chamber forms part of an exterior of the housing.

5. The sensor assembly of claim 4, wherein the housing has a cylindrical shape.

6. The sensor assembly of claim 5, wherein the sensor window is recessed relative to the housing.

7. The sensor assembly of claim 1, further comprising a plurality of heat pipes including the heat pipe, wherein each of the plurality of heat pipes extends from the sensor body to the vapor chamber.

8. The sensor assembly of claim 1, further comprising thermal adhesive attaching the heat pipe to the vapor chamber.

9. The sensor assembly of claim 1, wherein the heat pipe includes a first segment elongated radially from the sensor body to the vapor chamber and a second segment elongated along the vapor chamber.

10. The sensor assembly of claim 9, wherein the second segment is elongated parallel to the axis.

11. The sensor assembly of claim 10, wherein the heat pipe includes a vapor cavity and a wick, the vapor cavity is elongated along the first segment and the second segment, and the wick is elongated along the first segment and the second segment.

12. The sensor assembly of claim 1, wherein the vapor chamber has a constant cross-section extending parallel to the axis.

13. The sensor assembly of claim 12, wherein the vapor chamber extends parallel to the axis from below the sensor window to above the sensor window.

14. The sensor assembly of claim 1, wherein the vapor chamber extends circumferentially around the axis for at least 90°.

15. The sensor assembly of claim 1, wherein the sensor window is flat.

16. The sensor assembly of claim 1, wherein the sensor window extends circumferentially around the axis for at most 45°.

17. The sensor assembly of claim 1, wherein the vapor chamber is one of at least one vapor chamber, the sensor window is one of at least one sensor window, the at least one sensor window collectively extends circumferentially around the axis for at most 90°, and the at least one vapor chamber collectively extends circumferentially around the axis for at least 270°.

18. The sensor assembly of claim 17, wherein the at least one sensor window includes two sensor windows, and each of the sensor windows extends for at most 45°.

19. The sensor assembly of claim 17, wherein the at least one vapor chamber includes two vapor chambers, and each of the vapor chambers extends for at least 135°.

20. The sensor assembly of claim 1, wherein the vapor chamber includes a vapor cavity configured to move the working fluid that has evaporated from a hot region of the vapor chamber to a cool region of the working chamber and a wick configured to move the working fluid that has condensed from the cool region to the hot region.

* * * * *